United States Patent [19]

Dischert et al.

[11] 4,141,040
[45] Feb. 20, 1979

[54] VIDEO SIGNAL AMPLITUDE REGISTRATION SYSTEM

[75] Inventors: Robert A. Dischert, Burlington; Robert E. Flory, Princeton, both of N.J.

[73] Assignee: RCA Corporation, New York, N.Y.

[21] Appl. No.: 841,194

[22] Filed: Oct. 11, 1977

[51] Int. Cl.² .................. H04N 5/14; H04N 5/19; H04N 5/34; H04N 9/535

[52] U.S. Cl. .................. 358/160; 358/219; 358/221; 358/21

[58] Field of Search .................. 358/21, 27, 29, 74, 358/160, 219, 221

[56] References Cited

U.S. PATENT DOCUMENTS

| 3,949,162 | 4/1976 | Malueg | 358/221 X |
| 3,988,776 | 10/1976 | Shinozoki et al. | 358/219 X |
| 4,050,085 | 9/1977 | Prince et al. | 358/219 |

FOREIGN PATENT DOCUMENTS

| 34495 | 5/1967 | Japan | 358/219 |
| 396002 | 1/1974 | U.S.S.R. | 358/160 |
| 487470 | 1/1976 | U.S.S.R. | 358/219 |

Primary Examiner—Robert L. Griffin
Assistant Examiner—Aristotelis M. Psitos
Attorney, Agent, or Firm—Eugene M. Whitacre; Paul J. Rasmussen; Mason DeCamillis

[57] ABSTRACT

A video signal amplitude registration system for a television camera is provided in which the video amplitude of two or more related video signals derived from scanning a common reference are compared with a rising ramp voltage so as to generate a control voltage proportional to the misregistration of the video signal amplitudes at both the black and white signal levels.

10 Claims, 4 Drawing Figures

VIDEO SIGNAL AMPLITUDE REGISTRATION SYSTEM

BACKGROUND OF THE INVENTION

This invention relates to television camera systems for insuring the registration of the amplitude of video signals developed by multiple image pickup devices in a television camera.

In a multiple image pickup television camera, such as a modern color camera, it is necessary to insure that the television raster developed in conjunction with each image pickup device is in registration and further necessary to insure that the amplitude of the video signal developed by each image pickup device, for example, the red, green, and blue color images, are substantially the same amplitude at both the black level (absence of light) and the white level, which represents full illumination and equal amounts of red, green, and blue color signals. Automatic gain control (AGC) circuits are known, in which the video signal amplitudes are compared with a given reference in a comparator circuit to develop a control signal which is, in turn, coupled back to a gain control device for adjusting the amplitudes of the video signals. However, these known circuits are generally analog in nature, whereas the more modern trend in television camera systems is to provide digital control of all such automatic functions. It is desirable, therefore, to develop the required control signals inexpensively and directly in digital form so that they may be processed with known digital control systems, such as microprocessor control systems.

SUMMARY OF THE INVENTION

A video signal amplitude registration system is provided for a television camera system including at least two image pickup devices and means for developing related video signals, said video signals differing in amplitude relative to each other. The system comprises means for inserting a common signal generating reference in the image path of the image pickup devices for generating related first and second video signals in the image pickup devices. Means for generating a varying reference signal common to the first and second video signals, the reference signal increasing in amplitude from an initial point of reference below the expected minimum video signal to a point above the expected maximum video signal. First and second signal translating channels, each having signal detector means for developing respective first and second gating signals when the varying reference signal exceeds the first and second related video signals. First and second counter means are coupled to clock means which generate a reference frequency and are responsive to the respective first and second gating signals for counting the reference frequency from the initial point of said common reference signal to the first and second gating signals, whereby the count of the first and second counters indicate the amplitudes of the related video signals relative to each other. Control means are coupled to the first and second counters for developing a control signal indicative of the difference in amplitude of the related video signals. Means are coupled to the image pickup means responsive to the control signal for minimizing the difference between the video signal amplitudes.

DESCRIPTION OF THE PREFERRED EMBODIMENT

Figure 1:
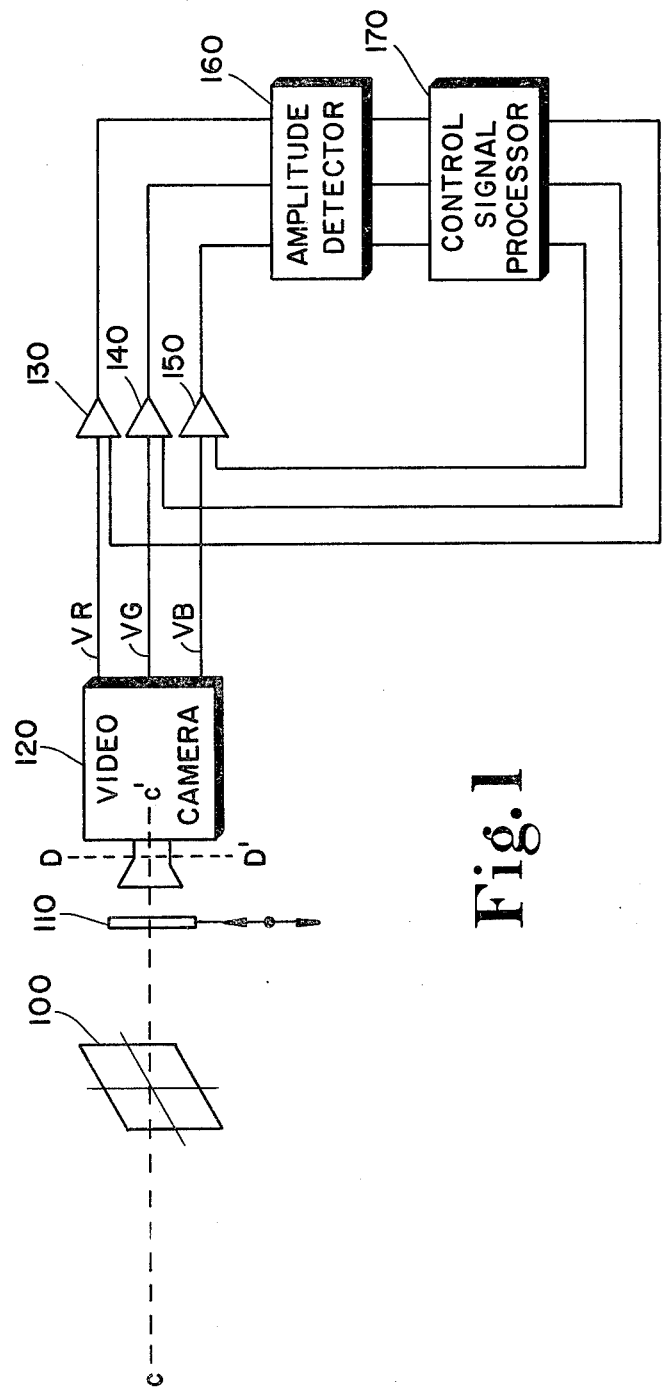
FIG. 1 is a block diagram of a system embodying the invention.

In FIG. 1, a reference pattern chart 100, for example, of a solid white background, is placed in the image path C—C' of a television camera 120. Alternatively, the reference pattern chart may be placed in the image path C—C' by insertion within the lens system, as illustrated by the dashed reference line D—D'. Also shown in the image path C—C' of television camera 120 is a lens cap 110 shown diagrammatically as being capable of movement in and out of the image path. When placed in the image path, lens cap 110 blocks out all external light from the lens system. Alternatively, the white pattern chart 100 may be replaced with a solid black chart or a combined black and white pattern chart may be utilized.

Video camera 120, which may be a typical color television camera containing, for example, three image pickup devices and their related raster generating circuits (not shown), develops three video output signals identified as $V_R$, $V_G$ and $V_B$ coupled to gain controlled video amplifiers 130, 140, 150 for the respective red, green and blue portions of the scene being viewed in the image path C—C'.

The operation of the lens cap 110 and/or the scanning of the reference pattern 100 is common to the image path C—C' of all three image pickup devices, and since a capped lens system represents no image and a white color reference represents equal amounts of red, green and blue colors, the amplitude of the video output signals $V_R$, $V_G$ and $V_B$ will represent the operation of the three image pickup devices with respect to sensitivity, gain, and related parameters.

As previously stated, it is necessary for the amplitude of the video signals to be equal at both black level (no image light) and at white level if proper operation of the color television camera is to be achieved. Amplitude detector 160, as will be described in detail, detects the amplitude difference of the three video signals $V_R$, $V_G$ and $V_B$ coupled to its inputs and develops an error output signal, which is coupled, in turn, to a control signal processor 170. Control processor 170 determines the amount and direction of the amplitude misregistration at both black and white signal levels of each image pickup device video signal by utilizing one of the related video signals as a reference.

The amount and direction of the amplitude misregistration of the red video signal amplitude, relative to the green video signal amplitude and the blue video signal amplitude, relative to the green video signal amplitude, yields two control signals indicative of the red and blue video amplitude misregistration relative to the green video amplitude. The red and blue amplitude difference output signals are coupled, in turn, to the gain control input terminals of video amplifiers 130 and 150, where they are utilized to adjust the gain of the amplifiers 130 and 150 so as to make the input signals $V_R$ and $V_B$ at the input terminals of amplitude detector 160 substantially identical to the amplitude of $V_G$.

The video signal amplitude registration system of FIG. 1, as generally described above, therefore forms a closed loop automatic amplitude registration system for a television camera system whose primary accuracy of registration is dependent almost wholly on the ability of amplitude detector 160 to sense differences in the video amplitudes of the related video output signals at both black and white signal levels.

Figure 2:
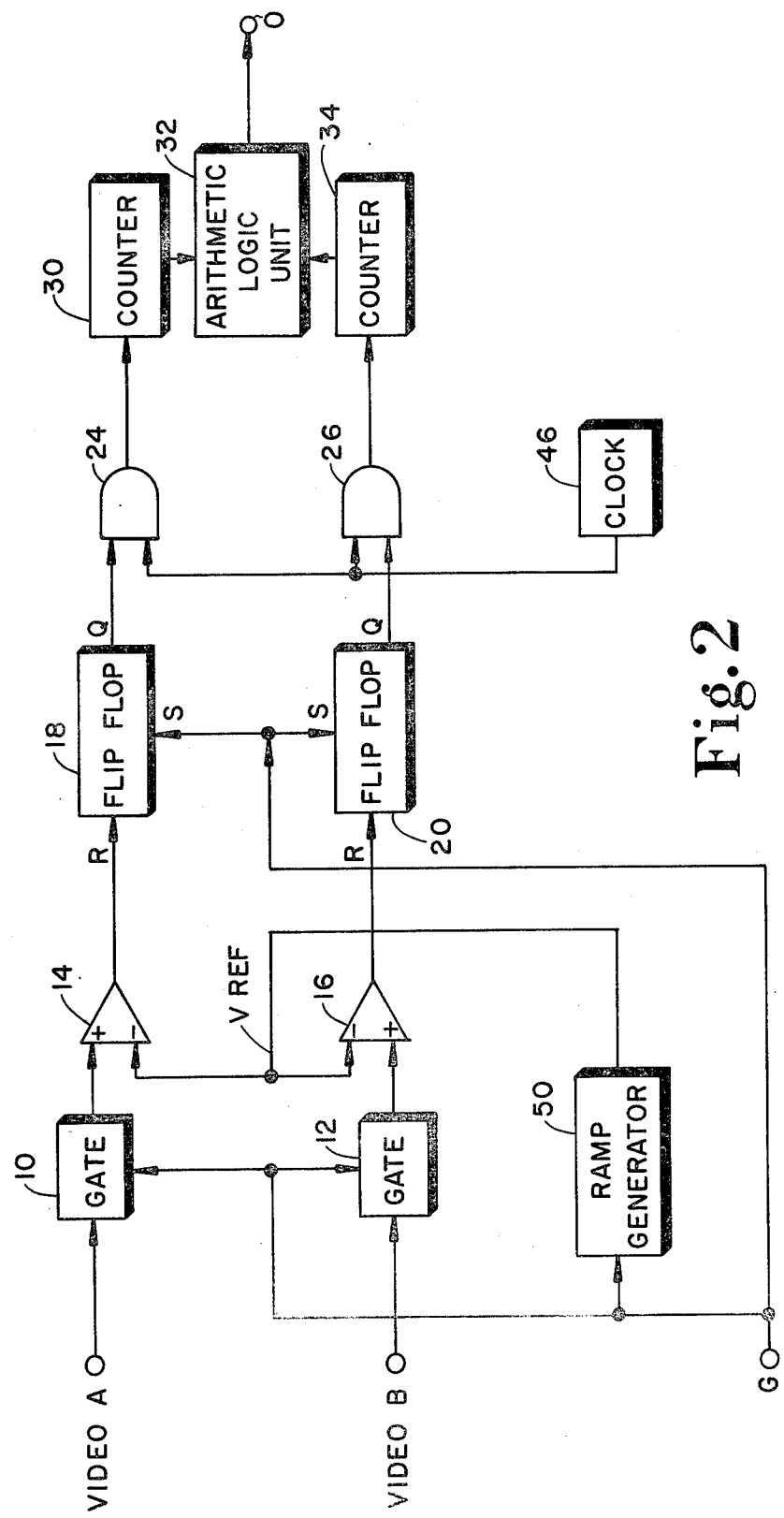
FIG. 2 is a block diagram of a signal amplitude detector embodying the invention.
Figure 3B:
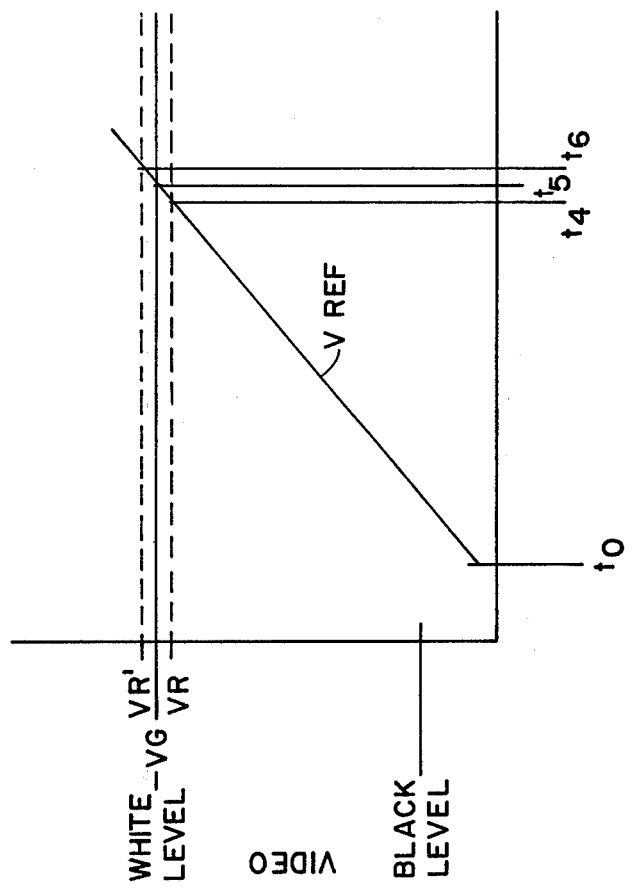
FIGS. 3a & 3b illustrate waveforms depicting the operation of the system of FIG. 2.
Figure 3A:
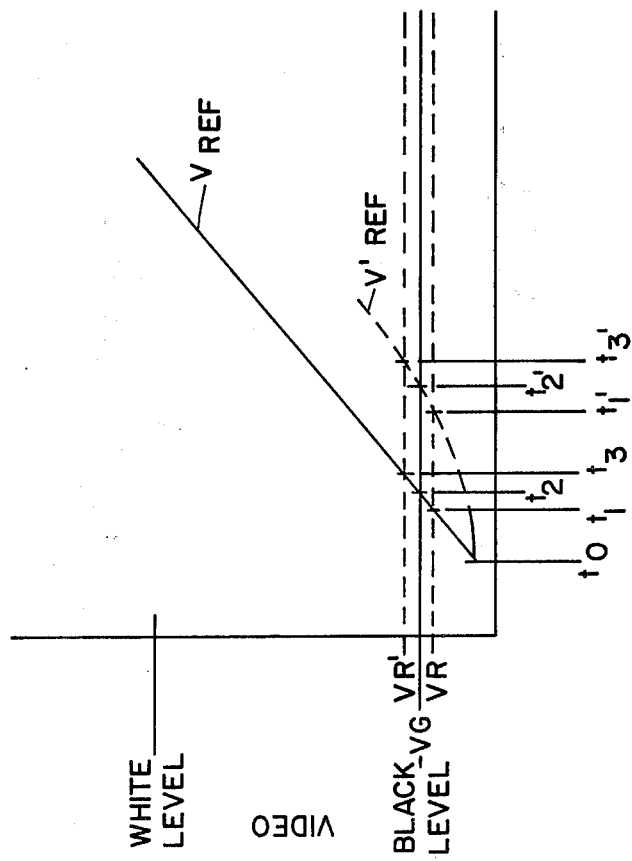

FIG. 2 illustrates an embodiment of an amplitude detector 160 in accordance with the present invention. In FIG. 2, two related video signals corresponding, for example, to $V_R$ and $V_G$ of FIG. 1, are coupled to the input terminals of video gates 10 and 12. A gating signal G, which is derived from the system logic generator (not shown), is coupled to gates 10 and 12, to the set terminals of flip-flops 18 and 20, and to the input terminal of a ramp generator 50; thus, gating signal G simultaneously enables gates 10 and 12, sets flip-flops 18 and 20, and initiates ramp generator 50 all at the same time $t_o$ of waveforms 3a and 3b. The enabling of gates 10 and 12 allows the related video waveforms $V_G$ and $V_R$ to appear at the output terminals of gates 10 and 12. The output video signals from gates 10 and 12 are, in turn, coupled to one input terminal each of comparators 14 and 16. The other inputs of comparators 14 and 16 are coupled to the output of ramp generator 50. The output signal of ramp generator 50 is a varying reference potential arranged to start at time $t_o$ at a level lower than the expected minimum video signal corresponding to black level and rising to a level greater than the maximum video signal corresponding to white level, as illustrated by $V_{REF}$ in FIGS. 3a and 3b. In operation, signals at the outputs of comparators 14 and 16 are low until the constant level video signal amplitude of input video signals A and B are exceeded by the $V_{REF}$, which is a rising ramp voltage. At this point, the output of comparators 14 and 16 go high, although not necessarily at the same time if, as shown in FIGS. 3a and 3b, the video amplitude $V_R$ is above or below the video amplitude of $V_G$. The outputs of comparators 14 and 16 in the form of either a low or high are coupled, in turn, to the respective inputs R of flip-flops 18 and 20. The output of flip-flops 18 and 20 are coupled to one input each of respective gates 24 and 26. One input each of gates 24 and 26 is coupled to the output of a clock pulse generator 46 operating, for example, at a nominal frequency of 100 Megahertz. The outputs of gates 24 and 26 are coupled to the respective input terminals of counter circuits 30 and 34. The outputs of counters 30 and 34 are coupled to respective inputs of an arithmetic logic unit 32 which, for example, may sum or subtract the number of counts stored in counters 30 and 34 for developing at an output terminal 0 the sum or difference of the total number of counts stored in counters 30 and 34.

The operation of the detector of FIG. 2 is as follows. With the input video signal A applied to gate 10, a gating signal G enables gate 10, initiates ramp generator 50, and sets flip-flop 18 at a time $t_o$, as shown in FIG. 3a. FIG. 3a shows the video signals $V_R$ and $V_G$ corresponding to video signal inputs A and B of FIG. 2 as occurring at black level, that is, with the lens capped. The flip-flop 18, having been set, enables gate 24, which allows counter 30 to accumulate clock pulses from clock pulse generator 46 as counts in its registers. As the ramp reference voltage output continues to rise from a point below the minimum expected video (black level) from time $t_o$, it intersects the video input signal A, shown as $V_R$ in FIG. 3a and causes comparator 14 to go high, thus causing flip-flop 18 to change state, which, in turn, disables gate 24 and cutting off the source of clock pulses from clock pulse generator 46 to counter 30. Counter 30 now has stored in its registers a total count from the time $t_o$ to $t_1$. In similar fashion, video input signal B, corresponding to $V_G$ of FIG. 3a is applied to gate 12, is translated by comparator 16, flip-flop 20 and gate 26 to accumulate a total count in counter 34 equal to the time $t_o$ to $t_2$, as shown in the waveforms of FIG. 3a. If the video output $V_R$ had been greater in amplitude than the amplitude of video output $V_G$, as shown by $V_R'$ in FIG. 3a, then counter 30 would have a count accumulation of from $t_o$ to $t_3$.

Counters 30 and 34 now have stored in their respective registers a digital count representing the respective amplitudes of the applied video signals. Arithmetic logic unit 32 subtracts one from the other to provide at the output terminal 0 a digital number representing the amplitude difference of the two video signals. This digital number may be used directly, for example, in a microprocessor system, for developing the desired control signal, or alternatively stored in a digital accumulator and converted to a control signal by means of a digital-to-analog (D-A) converter. The output of the D-A converter may be reduced to a dc control voltage suitable for coupling to the gain control terminals of video amplifiers 130 of FIG. 1 for adjusting the amplitude of video signals $V_R$ to correspond to the amplitude of video signal $V_G$. Under control of the system logic, the detector of FIG. 2 is then utilized for comparing the amplitude of $V_B$ to that of $V_G$ by coupling $V_B$ to input terminal A of the detector of FIG. 2 and reinitiating the measurement by a new gating signal G.

The waveforms of FIG. 3b illustrate the identical operation of the detector of FIG. 2 when the camera lens is uncapped, and the camera is allowed to scan the white reference chart. Counter 34 now accumulates clock pulses from clock pulse generator 46, as counts from the time $t_o$ to $t_5$, representing the reference signal $V_G$, while counter 30 accumulates clock pulses as counts from the time $t_o$ to $t_4$ or $t_6$, depending on whether the related video amplitude being compared was less than or greater than the amplitude of the reference video signal $V_G$ applied to video input B of the detector of FIG. 2.

Insofar as described, the resolution of the video signal amplitude difference for both black level and white level measurements are identical and dependent largely on the frequency of the clock 46 which, in the example shown, is a nominal 100 Magahertz, and the fact that the $V_{REF}$ voltage reference, as shown in FIGS. 3a and 3b, is a linear ramp. With a linear ramp and a nominal clock frequency of 100 Megahertz and a measurement interval (ramp time) of 1 microsecond, each count would correspond to approximately 1 percent of the video level measuring range. However, it is normally desirable to have a greater measuring accuracy or resolution of any existing signal amplitude difference at black level than at white level. This increased resolution may be obtained inexpensively without increasing the clock frequency by generating $V_{REF}$ as a non-linear ramp (shown as $V_{REF}'$ in FIG. 3a) by constructing ramp generator 50 as an integrator with an insufficient time constant to achieve a linear ramp voltage output. Thus, for example, as shown in FIG. 3a, the counters of the detector of FIG. 2 accumulate counts from time $t_o$ to $t_2'$ and $t_o$ to $t_1'$ as compared to the count $t_o$ to $t_2$ and $t_o$ to $t_1$ for a linear ramp without substantially affecting the resolution accuracy at the white level measurements.

As described above, the related red and blue video signals are compared with the green video signal for correction of amplitude registration; however, the present invention is also applicable in the event only a single video signal is available, or it is desired to compare the red, blue and green video signals in an absolute measurement, for example, against a system reference level for both black and white level signals. In the above described example of a single video signal, a system reference corresponding to black or white level is coupled to one input, for example, video A of the detector of FIG. 2, while the video signal to be compared is coupled to the video B input. With a fixed reference applied to one input, as described, counter 30 would have a count which would remain unchanged while counter B would have a count determined by any difference in amplitude, above or below, the fixed reference. Similarly, where a red, green and blue video signal are to be compared with a fixed or system reference, the reference is coupled to one input of the detector of FIG. 2, and the three video signals are alternatively coupled to the other input of the detector of FIG. 2 for successive measurements. The reference may, of course, be at black level, white level, or any desired system reference.

The control signals developed from the signal obtained from amplitude detector 160 of FIG. 1 need not be limited to application to amplifiers 130 and 150. They may be applied, for example, to control the sensitivity of the image pickup tubes by varying the target voltage or to control signal levels or gain or other video processing stages associated with camera 120.

What is claimed is:

1. A video signal amplitude registration system for a television camera system including at least two image pickup devices and means for developing related video signals, said video signals differing in amplitude relative to each other, comprising:
    means for inserting a common signal generating reference in the image path of said image pickup devices for generating related first and second video signals in said image pickup devices;
    means for generating a varying reference signal common to said first and second video signals, said reference signal increasing in amplitude from an initial point of reference below the expected minimum video signal to a point above the expected maximum video signal;
    clock means for developing a reference frequency;
    first and second signal translating channels, each having signal detector means for developing respective first and second gating signals when said varying reference signal exceeds said first and second related video signals;
    first and second counter means coupled to said clock means and responsive to said respective first and second gating signals for counting said reference frequency from said initial point of said common reference signal to said first and second gating signals, the count of said first and second counters indicating the amplitude of said related video signals relative to each other;
    control means coupled to said first and second counters for developing a control signal indicative of the difference in amplitude of said related video signals; and
    means coupled to said image pickup means responsive to said control signal for minimizing said video signal amplitude difference.

2. A video signal amplitude registration system for a television camera according to claim 1 wherein said first and second related video signals are at black level in a first case and at white level in a second case.

3. A video signal amplitude registration system for a television camera according to claim 1 wherein said common signal generating reference is a white color test chart for determining the amplitude registration for related white level video signals and a black color test chart for determining the amplitude registration for related black level video signals.

4. A video signal amplitude registration system for a television camera according to claim 2 wherein said common signal generating reference is a test chart comprising black and white color portions for determining the amplitude registration of said related black and white level video signals.

5. A video signal amplitude registration system for a television camera according to claim 3 wherein said varying reference signal means comprises a linear ramp generator.

6. A video signal amplitude registration system for a television camera according to claim 4 wherein said varying reference signal means comprises a ramp generator having a non-linear portion so as to increase the resolution for said video signals in said non-linear reference portion.

7. A video signal amplitude registration system for a television camera system including at least one image pickup device and means for developing a related video signal, said video signal differing in amplitude relative to a desired reference level comprising:
    means for inserting a common signal generating reference in the image path of said image pickup device for generating a related video signal in said image pickup device;
    means for developing a video amplitude reference signal;
    means for generating a varying reference signal common to said video amplitude reference signal and said video signals, said reference signal increasing in amplitude from an initial point of reference below the expected minimum video signal to a point above the expected maximum video signal;
    clock means for developing a reference frequency;
    first and second signal translating channels, each having signal detector means for developing respective first and second gating signals when said varying reference signal exceeds said video amplitude reference signal and said video signal;
    first and second counter means coupled to said clock means and responsive to said respective first and second gating signals for counting said reference frequency from said initial point of said common reference signal to said first and second gating signals, the count of said first and second counters indicating the amplitude of said video signal relative to said video reference signal;
    control means coupled to said first and second counters for developing a control signal indicative of the difference in amplitude of video signal and said video amplitude reference signal; and
    means coupled to said image pickup means responsive to said control signal for minimizing said video signal amplitude difference.

8. A video signal amplitude registration system for a television camera according to claim 1 wherein said video signal is at black level in a first case and at white level in a second case and said video amplitude reference is at black level in said first case and at white level in said second case.

9. A video signal amplitude registration system for a television camera system including at least two image pickup devices and means for developing related video signals, said video signals differing in amplitude relative to each other comprising:

means for inserting a common signal generating reference in the image path of said image pickup devices for generating related video signal in said image pickup devices;

means for developing a video amplitude reference signal;

means for generating a varying reference signal common to said video amplitude reference and said video signals, said reference signal increasing in amplitude from an initial point of reference below the expected minimum video signal to a point above the expected maximum video signal;

clock means for developing a reference frequency;

first and second signal translating channels, each having signal detector means for developing respective first and second gating signals when said varying reference signal exceeds any one of said related video signals and said video amplitude reference signal;

first and second counter means coupled to said clock means and responsive to said respective first and second gating signals for counting said reference frequency from said initial point of said common reference signal to said first and second gating signals, the count of said first and second counters indicating the amplitude of said related video signals relative to said video amplitude reference signal;

control means coupled to said first and second counters for developing a control signal indicative of the difference in amplitude of said related video signals and said video amplitude reference signal; and means coupled to said image pickup means responsive to said control signal for minimizing said video signal amplitude difference.

10. A video signal amplitude registration system for a television camera according to claim 1 wherein said related video signals are at black level in a first case and at white level in a second case and said video amplitude reference is at black level in said first case and at white level in said second case.

* * * * *